US012403998B2

(12) United States Patent
Zhang et al.

(10) Patent No.: US 12,403,998 B2
(45) Date of Patent: Sep. 2, 2025

(54) METHOD FOR ADJUSTING LUBRICATION OPTIMIZATION OF MARINE MAIN ENGINE CYLINDER BASED ON COMPUTER VISION

(71) Applicant: SHANGHAI MARITIME UNIVERSITY, Shanghai (CN)

(72) Inventors: Guichen Zhang, Shanghai (CN); Yanji Liu, Shanghai (CN); Qili Wu, Shanghai (CN); Chunchang Zhang, Shanghai (CN); Yifan Li, Shanghai (CN)

(73) Assignee: SHANGHAI MARITIME UNIVERSITY, Shanghai (CN)

( * ) Notice: Subject to any disclaimer, the term of this patent is extended or adjusted under 35 U.S.C. 154(b) by 195 days.

(21) Appl. No.: 18/506,476

(22) Filed: Nov. 10, 2023

(65) Prior Publication Data
US 2024/0158065 A1 May 16, 2024

(30) Foreign Application Priority Data
Nov. 11, 2022 (CN) .......................... 202211414114.1

(51) Int. Cl.
*B63H 21/38* (2006.01)
*G06V 20/59* (2022.01)

(52) U.S. Cl.
CPC ........... *B63H 21/386* (2013.01); *G06V 20/59* (2022.01)

(58) Field of Classification Search
CPC ...... B63H 21/386; G06V 20/59; G06V 10/28; G06V 10/30; G06V 10/36; G06V 10/763; G06F 18/23213; Y02T 90/00
See application file for complete search history.

(56) References Cited

U.S. PATENT DOCUMENTS 4,114,571 A * 9/1978 Ruf ........................... F01P 7/14
123/196 AB
5,987,976 A * 11/1999 Sarangapani .......... F01M 11/10
701/1

(Continued)

FOREIGN PATENT DOCUMENTS

CN 105332762 A 2/2016
CN 105754685 A 7/2016
(Continued)

OTHER PUBLICATIONS

Zheng Guojie, et al., "Analysis on cylinder lubrication technology of marine diesel engine," Tianjin Navigation, Mar. 25, 2009, pp. 13-16, Issue 01. Claims involved: 1-5.

(Continued)

*Primary Examiner* — Kurt Philip Liethen
(74) *Attorney, Agent, or Firm* — Pilloff Passino & Cosenza LLP; Rachel K. Pilloff; Sean A. Passino (57) ABSTRACT

Provided is a method for adjusting lubrication optimization of a marine main engine cylinder based on computer vision, and belongs to the technical field of marine power systems. The method includes: establishing a marine main engine lubrication database for cylinder lubrication analysis and quality evaluation; collecting cylinder lubrication data of each current cylinder, and preprocessing cylinder lubrication image set data; performing image segmentation and cluster analysis on the preprocessed cylinder lubrication image set, and comparing the preprocessed cylinder lubrication image set with the marine main engine lubrication database to obtain feature recognition results of carbon deposition, dirts, scratches and a wear degree; and according to the feature recognition results, evaluating a cylinder lubrication quality to obtain evaluation grades, and adjusting cylinder lubrication optimization according to the evaluation grades.

5 Claims, 6 Drawing Sheets

(56) References Cited

U.S. PATENT DOCUMENTS

| | | | | |
|---|---|---|---|---|
| 6,196,057 | B1* | 3/2001 | Discenzo | F16C 33/667 |
| | | | | 73/54.01 |
| 6,286,363 | B1* | 9/2001 | Discenzo | G01N 11/16 |
| | | | | 73/23.31 |
| 6,434,512 | B1* | 8/2002 | Discenzo | F16C 41/008 |
| | | | | 702/184 |
| 7,350,497 | B2* | 4/2008 | Hiraoka | F01M 11/02 |
| | | | | 123/196 R |
| 7,581,434 | B1* | 9/2009 | Discenzo | G01N 33/2888 |
| | | | | 73/53.01 |
| 2003/0101960 | A1* | 6/2003 | Tsuchiya | B63H 21/24 |
| | | | | 123/196 R |
| 2012/0285413 | A1* | 11/2012 | Pingen | F01M 5/02 |
| | | | | 123/196 R |
| 2018/0259978 | A1* | 9/2018 | Dweik | G16H 30/40 |
| 2021/0139040 | A1* | 5/2021 | Ganiger | G06N 20/00 |
| 2022/0046114 | A1* | 2/2022 | Entelis | H04L 69/04 |
| 2023/0125940 | A1* | 4/2023 | Mihara | F02N 11/0822 |
| | | | | 123/41.08 |

FOREIGN PATENT DOCUMENTS

| | | | |
|---|---|---|---|
| CN | 106762016 | A | 5/2017 |
| CN | 113032912 | A | 6/2021 |
| CN | 113158335 | A | 7/2021 |
| CN | 113958382 | A | 1/2022 |
| CN | 114970404 | A | 8/2022 |
| CN | 217638511 | U | 10/2022 |
| WO | 2021213603 | A1 | 10/2021 |

OTHER PUBLICATIONS

Notification to Grant Patent Right for Invention dated Dec. 3, 2023 in SIPO application No. 202211414114.1.

The second search report dated Nov. 7, 2023 in SIPO application No. 202211414114.1.

The first search report dated Sep. 27, 2023 in SIPO application No. 202211414114.1.

First Office Action for China Application No. 202211414114.1, mailed Oct. 10, 2023. (Best available copy.).

Zhang Zhibin et al., "Analysis On Oil Filling Rate and Lubrication Technology of Marine Diesel Engine Cylinder Oil," Feb. 2007.

Jiao Pinbo et al., "Performance Prediction of Marine Main Diesel Engine Based on Long Short-Term Memory Network," Transactions of CSICE, May 2021, pp. 250-256, vol. 39, No. 3.

Liu Shiwei, "Research and Analysis On Cylinder Lubrication Technology of Marine Diesel Engine," Apr. 2018.

Zhang Guichen-Application Research of Computer Vision Deep Learning on Marine Main Engine Cylinder Lubrication, https://v.youku.com/v_show/id_XNTg5NDg5MzE2NA==.html?playMode=pugv&frommaciku=1.

* cited by examiner

If the base number of the cylinder lubricating oil of the current cylinder is less than BN1 and the oil filling rate of the cylinder lubricating oil of the current cylinder exceeds δ1, gradually reducing the oil filling rate of the cylinder lubricating oil of the current cylinder until it falls within a range of δ2; after reducing the oil filling rate of the cylinder lubricating oil of the current cylinder by adjusting an amplitude μ1 of a cylinder oil filling rate every time, stopping for checking after keeping N1 days of continuous operation until the white deposits are finally eliminated ⟶ S411

If the base number of the cylinder lubricating oil of the current cylinder is higher than BN2, replacing BN3 cylinder oil with a low base number, and stopping for checking after N1 days of continuous operation; if the white deposits still exist, gradually reducing the oil filling rate of the cylinder lubricating oil of the current cylinder until it falls within a range of δ3; after reducing the oil filling rate of the cylinder lubricating oil of the current cylinder by adjusting the amplitude μ1 of the cylinder oil filling rate every time, stopping for checking after keeping N1 days of continuous operation until the white deposits are finally eliminated ⟶ S412

FIG. 6

METHOD FOR ADJUSTING LUBRICATION OPTIMIZATION OF MARINE MAIN ENGINE CYLINDER BASED ON COMPUTER VISION

CROSS-REFERENCE TO RELATED APPLICATIONS

This disclosure claims priority to Chinese Patent Application No. 202211414114.1, filed on Nov. 11, 2022, the contents of which are hereby incorporated by reference.

TECHNICAL FIELD

The disclosure relates to the technical field of marine power systems, in particular to a method for adjusting lubrication optimization of a marine main engine cylinder based on computer vision.

BACKGROUND

Friction/wear and lubrication are bases and key technology of mechanical movement, and related researches mostly focus on friction mechanism, wear analysis, lubricating oil and quality checking, fault diagnosis and other fields. Researches on cylinder lubrication of marine low-speed engines are mostly passive and afterwards, and there is no optimal control technology and method for a cylinder lubrication process.

A marine main engine is a low-speed two-stroke diesel engine, and its cylinder lubrication is a difficulty and key point of turbine management. A management level of a cylinder lubrication process determines one of key factors for a life of a low-speed diesel engine, and an improper management often leads to cylinder pulling, which affects an operation and safety of a ship. Key factors for determining a quality of cylinder lubrication are a base number and an oil filling rate of cylinder oil. At present, there is no quantifiable and fixed experience or standard to control the quality of cylinder lubrication. Most of standards are empirical descriptions of cylinder lubrication process management and tentative adjustments of the oil filling rate by manual experiences, and there is a lack of application researches on advanced technology of computer vision for cylinder lubrication.

Marine engineers are highly mobile, working on a ship for about 10 months. It is difficult to effectively transfer an experience of cylinder lubrication of the main engine to succeeding engineers during a shift change. When the engineers work on another ship, they may use working experiences of other ships, and a probability of errors is high. At the same time, a method for adjusting cylinder lubrication optimization on a new ship needs to be explored again. In particular, the fuel burned by the ship is uncontrollable in quality and complex in composition due to different producing areas and different oil suppliers. When the fuel burned by the main engine changes, the cylinder lubrication needs to be readjusted. On the other hand, changing sea conditions and ship working conditions lead to unstable combustion, and the cylinder lubrication needs to be adjusted in time. All these factors challenge an optimal adjustment of base number-oil filling rate of cylinder lubricating oil.

Therefore, it is of great significance and application value to develop an image analysis technology of cylinder lubrication scavenging port by computer vision to replace classification, recognition and grade evaluation of cylinder lubrication quality by human eyes and apply to the adjustment of cylinder oil filling rate, so as to solve a problem of optimal management of cylinder lubrication and fill a gap in the field of turbine management.

SUMMARY

Aiming at defects of the prior art, a cylinder lubrication adjustment based on computer vision according to the disclosure may prevent a cylinder liner from being excessively worn, solve a problem of an inexperienced engineer and fill a gap in the field of turbine management.

In order to achieve the above objective, the disclosure provides a method for adjusting lubrication optimization of a marine main engine cylinder based on computer vision, including:

S1, establishing a marine main engine lubrication database, including a cylinder lubrication image set, cylinder lubricating oil data and scavenging port residual oil data of an ex-factory bench cylinder, as well as a cylinder lubrication image set, cylinder lubricating oil data and scavenging port residual oil data of a historical cylinder collected in a previous operation;

S2, collecting a cylinder lubrication image set, cylinder lubricating oil data and scavenging residual oil data of a current cylinder in real time, and preprocessing the cylinder lubrication image set of the current cylinder;

S3, performing image segmentation and a cluster analysis on a preprocessed cylinder lubrication image set of the current cylinder, and comparing the preprocessed cylinder lubrication image set with the marine main engine lubrication database to obtain feature recognition results of carbon deposition, dirts, scratches and a wear degree; and S4, evaluating a cylinder lubrication quality according to the feature recognition results to obtain evaluation grades, and optimizing and adjusting cylinder lubrication according to the evaluation grades.

In an embodiment, preprocessing the cylinder lubrication image set of the current cylinder in the S2 includes:

image correction: locating areas of images in the cylinder lubrication image set of the current cylinder, extracting image feature information, using Hough transform for a line measurement and an inclination angle calculation, and then rotating the images to obtain an image correction result;

image smoothing filtering: using a weight adaptive image denoising method based on morphology to reduce image noises and random noises in an image acquisition process; adopting a median filtering method to sort gray values in a neighbourhood of pixels and then taking a median value as a new gray value of a central pixel, making pixels with abrupt brightness values in the neighborhood appear at a beginning or an end of a sequence, and eliminating these pixels with a median filtering algorithm;

image graying: according to an image defogging technology based on histogram optimization, graying an original red green blue (RGB) image by a weighted average method to obtain a most suitable gray image for observation; and image binarization: setting a threshold value $\Gamma$ of the gray values for separating a target from a background; when a gray value of a pixel point is $<\Gamma$, a color value of the point is 0, otherwise, the color value is 1.

In an embodiment, a feature identification method in the S3 includes:
- S31, normalizing the preprocessed cylinder lubrication image set of the current cylinder, and obtaining a recognition image set to be detected;
- S32, dividing the recognition image set to be detected into areas with different characteristics based on threshold segmentation and watershed segmentation, and extracting interested targets, including white carbon deposits, black carbon deposits and the scratches, and obtaining an image segmentation result;
- S33, performing a cluster analysis on the recognition image set to be detected by using a K-means mean method, wherein a K-means clustering algorithm judges whether a classification is correct or not in each iteration, adjusts and modifies a clustering center, and enters a next iteration until a criterion function of sum of squares of errors for evaluating a clustering performance is local minimum, and obtaining a cluster analysis result; and
- S34, comparing the image segmentation result and the cluster analysis result with the cylinder lubrication image set of the ex-factory bench cylinder, and obtaining feature recognition results of carbon deposition, dirts, scratches and a wear degree of a detected image; and selecting cylinder lubricating oil data and scavenging port residual oil data corresponding to the cylinder lubricating image set of the closest historical cylinder as reference values after image comparison with the cylinder lubricating image set of the historical cylinder.

In an embodiment, the cylinder lubrication image set includes four types of images: an inner surface of a cylinder liner, a piston head area, a side of a piston head and a piston ring area;

the cylinder lubricating oil data includes a base number and an oil filling rate of cylinder lubricating oil; and the scavenging port residual oil data includes a residual base number and an iron content of scavenging port residual oil.

In an embodiment, the evaluation grades are divided into three grades:
- grade I: there are no scratches on the inner surface of the cylinder liner, and white deposits appear at a top of the piston head, the side of the piston head or around a first ring in the piston ring area, indicating that the oil filling rate of the cylinder lubricating oil of the current cylinder is too high or the base number of the cylinder lubricating oil of the current cylinder is too high;
- grade II: there are no scratches on the inner surface of the cylinder liner, and black carbon deposits appear at the top of the piston head, the side of the piston head or around the first ring groove in the piston ring area, indicating that the oil filling rate of the cylinder lubricating oil of the current cylinder is too low or the base number of the cylinder lubricating oil of the current cylinder is too low; and
- grade III: there are scratches on the inner surface of the cylinder liner and/or pitting, peeling and pits on a surface of the piston ring, indicating that the oil filling rate of the cylinder lubricating oil of the current cylinder is too low and a dry friction occurs; there are scratches on the inner surface of the cylinder liner, and the inner surface of the cylinder liner is reddish, and deposits on the top of the piston head are reddish, or/and there are scratches on the surface of the piston ring, indicating that the cylinder is lubricated excessively and the base number of the cylinder lubricating oil of the current cylinder is too high, resulting in abrasive wear.

In an embodiment, methods for adjusting lubrication optimization of the cylinders include:
- S41, a method for adjusting lubrication optimization of a grade I cylinder
- S411, if the base number of the cylinder lubricating oil of the current cylinder is less than BN1 and the oil filling rate of the cylinder lubricating oil of the current cylinder exceeds $\delta1$, gradually reducing the oil filling rate of the cylinder lubricating oil of the current cylinder until it falls within a range of $\delta2$; after reducing the oil filling rate of the cylinder lubricating oil of the current cylinder by adjusting an amplitude $\mu1$ of a cylinder oil filling rate every time, stopping for checking after keeping N1 days of continuous operation until the white deposits are finally eliminated; and
- S412, if the base number of the cylinder lubricating oil of the current cylinder is higher than BN2, replacing BN3 cylinder oil with a low base number, and stopping for checking after N1 days of continuous operation; if the white deposits still exist, gradually reducing the oil filling rate of the cylinder lubricating oil of the current cylinder until it falls within a range of $\delta3$; after reducing the oil filling rate of the cylinder lubricating oil of the current cylinder by adjusting the amplitude $\mu1$ of the cylinder oil filling rate every time, stopping for checking after keeping N1 days of continuous operation until the white deposits are finally eliminated;
- S42, a method for adjusting lubrication optimization of a grade II cylinder
- if the cylinder oil filling rate lubricating oil of the current cylinder is lower than 64, gradually increasing the oil filling rate of the cylinder lubricating oil of the current cylinder until black carbon deposits in an upper area of the piston ring are eliminated; after increasing by adjusting an amplitude $\mu1$ of the oil filling rate every time, stopping for checking after keeping N2 days of continuous operation; if the cylinder oil filling rate lubricating oil of the current cylinder is increased to $\delta5$ and the black carbon deposits are still not eliminated, replacing with cylinder oil with a base number of BN2 and stopping for checking after N1 days of continuous operation; if a checking result confirms that a trend of the black carbon deposits decreases, continuing to use cylinder oil with a high base number; if it is found that the black carbon deposits disappear or slightly white carbon deposits appear, changing with cylinder lubricating oil with a low base number of BN3; and if the checking result shows that the black carbon deposits continue to exist and have a trend of increasing development, replacing a fuel injector of the cylinder and following up; and
- S43, a method for adjusting lubrication optimization of a grade III cylinder
- grade III indicates that the cylinder liner has an excessive wear accident, so the engine should be stopped immediately to perform lift cylinder checking and measurement; if a wear rate of the main engine cylinder liner exceeds a limit value M and a wear amount of the cylinder liner exceeds a limit value k, replacing with a new cylinder liner; if the wear amount of the cylinder liner does not exceed the limit value k, reducing the base number of the cylinder lubricating oil of the current cylinder, and selecting BN4 cylinder oil with a low base number; meanwhile, increasing the oil filling rate of the cylinder lubricating oil of the current cylinder until hard contact marks are eliminated, and stopping for checking after keeping N1 days of continuous operation after increasing by adjusting an amplitude μ2 of the cylinder oil filling rate every time; if an excessive wear phenomenon is eliminated, gradually reducing the oil filling rate of the cylinder lubricating oil of the current cylinder to δ6, and stopping to open a scavenging box for checking after keeping N1 days of continuous operation after reducing by adjusting the amplitude μ2 of the cylinder oil filling rate every time; if the cylinder oil filling rate lubricating oil of the current cylinder increases to the limit value of δ5 and the hard contact marks are still not eliminated, strengthening fuel filtration or replacing fuel, and confirming whether there is a need to replace a new cylinder liner after re-measuring the cylinder liner.

In an embodiment, δ1=1.1 g/kwh, δ2=0.9-1.05 g/kwh, δ3=1.0 g/kwh, δ4=0.9 g/kwh, δ5=1.2 g/kwh, and δ6=0.9-1.1 g/kwh, μ1=0.05/kwh/time, μ2=0.2/kwh/time, N1=3, N2=2, M=0.1 mm/1000 h, K=4/1000 cylinder diameter, BN1=BN70, BN2=BN70-BN100, BN3=BN40-BN70, and BN4=BN40.

In an embodiment, in a process of adjusting each grade of cylinder lubrication optimization, detecting the residual base number and the iron content of the scavenging port residual oil of the current cylinder for many times to judge an optimal adjustment direction;

if the iron content of the scavenging port residual oil shows a downward trend, indicating that the cylinder wear is reduced; if the iron content of the scavenging port residual oil is ≥70 ppm and is most reduced, stopping an adjustment to check a fuel system, check whether particulate matters in fuel components exceed a standard and whether a main engine oil head is poorly atomized; and if the residual base number of the scavenging port residual oil is <25% of the base number of the cylinder lubricating oil, selecting cylinder oil with a base number one size higher than the base number of the cylinder lubricating oil;

The disclosure has beneficial effects as follows.

(1) A computer vision technology is used to quantitatively process pixel values of a dirty degree of the inner surface of the cylinder liner, the top of the piston head, the side of the piston head and the piston ring area checked by the scavenging port, and the evaluation grade is obtained by comprehensively analyzing historical data, so as to overcome shortcomings and mistakes of manual observation and qualitative description by experience.

(2) A feature model of marine main engine cylinder lubrication is established, and the databases of main engine type, bench test data, trial data, operation data and checking result data are established. Before the main engine operates, an engine preparation program is started, and current operation data and historical data are compared and analyzed from multiple angles, providing the reference values (oil filling rate and base number) for selecting cylinder lubrication for this main engine operation, overcoming problems of inaccuracy and low reliability of experience selection of an engineer.

(3) During an normal operation of the main engine, an optimal adjustment program of the cylinder lubrication is executed, so that the iron content in the scavenging port residual oil tends to the minimum and an influence of fuel instability is overcame, thus achieving a goal of minimum cylinder liner wear of the main engine. During the operation of the main engine, abnormal problems of the cylinder lubrication are found through the detection of the scavenging port residual oil, and an adjustment program of cylinder lubrication optimization is immediately executed, and the cylinder lubrication data and in-cylinder image processing are analyzed. The historical data and the image set are compared and analyzed, and reference data and an adjustment direction of this adjustment of cylinder lubrication are obtained. During an adjustment process, a development trend of the iron content in the scavenging port residual oil should be reduced, thus solving a problem that the engineer needs to tentatively adjust the oil filling rate of the cylinder at present and the error is high.

DETAILED DESCRIPTION OF THE EMBODIMENTS

The disclosure will be further described with reference to attached drawings and embodiments.

Figure 1:
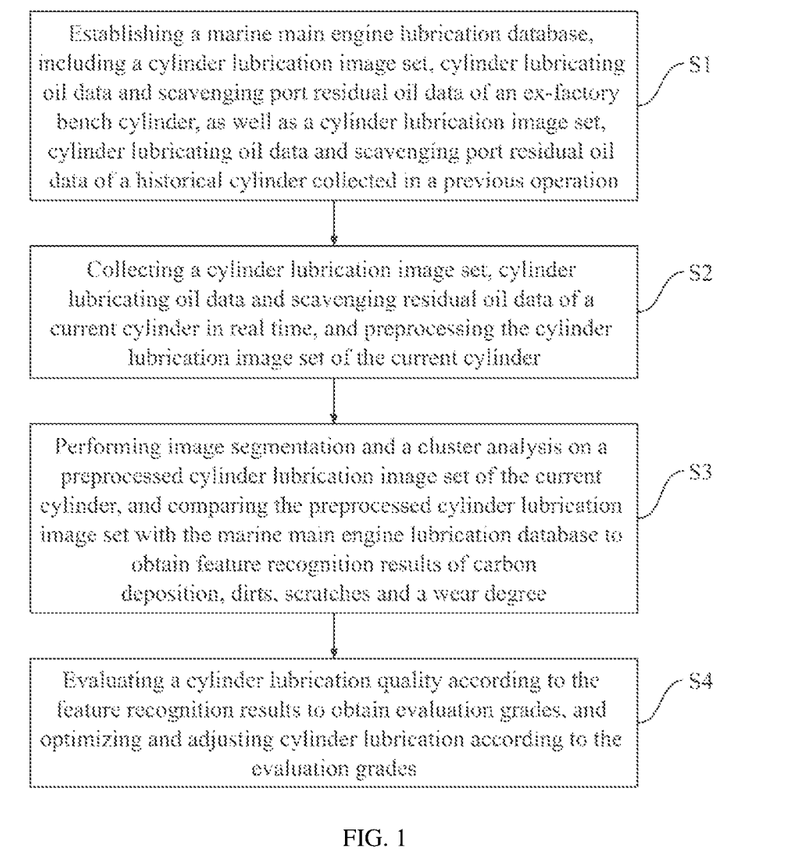
FIG. 1 is a schematic flow chart of a method for adjusting lubrication optimization of a marine main engine cylinder based on computer vision according to an embodiment of the disclosure.
Figure 2:
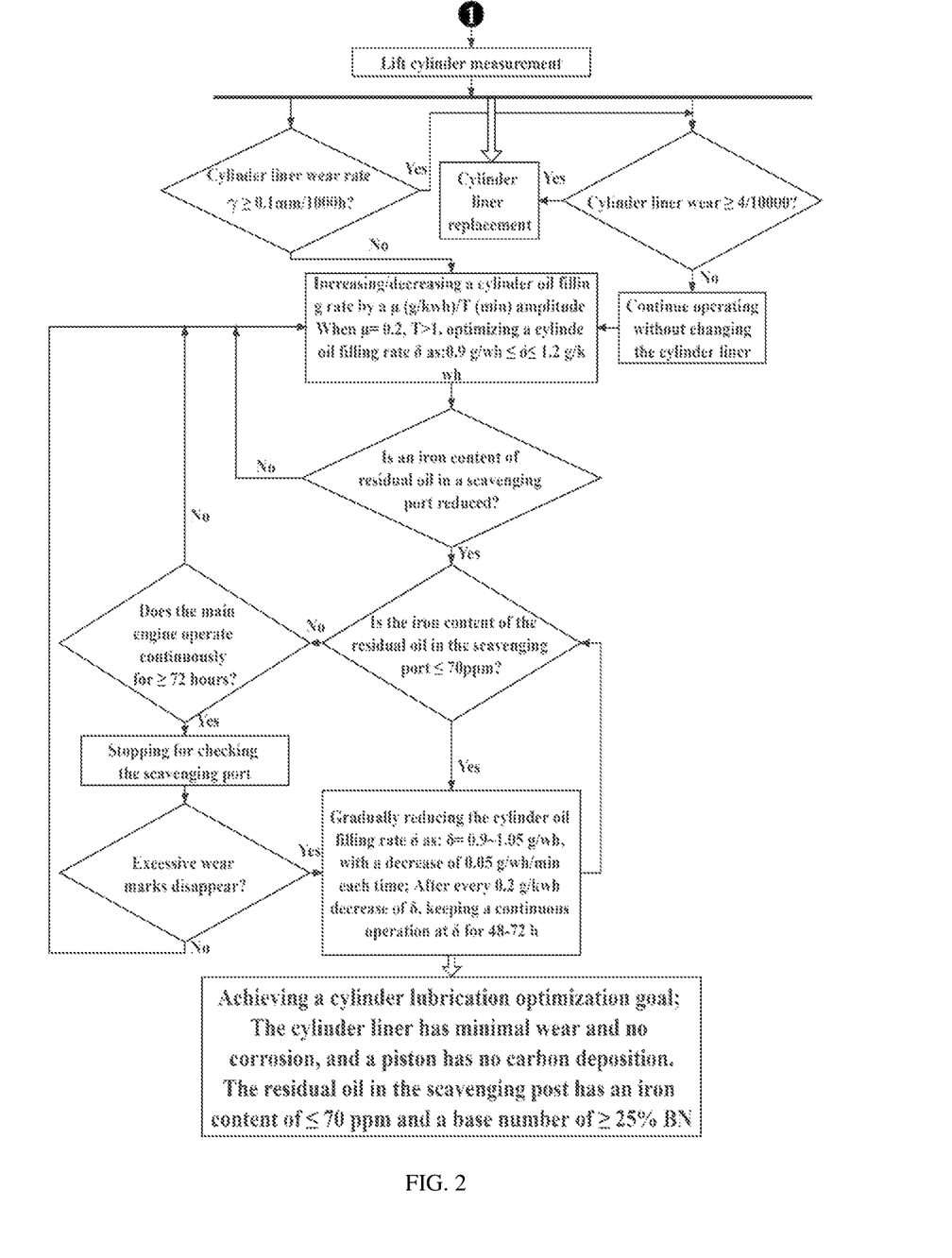
FIG. 2 is a schematic process diagram of cylinder lubrication optimization according to an embodiment of the disclosure.

At present, a cylinder lubrication control system of a marine low-speed engine may not adjust a cylinder oil filling rate according to a cylinder lubrication condition. The cylinder lubrication condition requires an engineer to stop the engine, open a scavenging port to take pictures and observe an inside of a cylinder liner and a piston head, evaluate images of an inner surface of the cylinder liner, a top of the piston head, a side of the piston head and a piston ring area, and then manually adjust the cylinder oil filling rate based on a management experience of the engineer. This process is cumbersome, inefficient, and is largely influenced by a work experience of the engineer, which is also a main reason for excessive wear and tear of the cylinder liner of the marine main engine. An innovation of the disclosure is to learn internal images of a cylinder lubrication system by computer vision, compare and analyze the images with historical data, evaluate a quantitative grade of a cylinder lubrication state, and automatically adjust the cylinder oil filling rate, with a high efficiency and a high adjustment accuracy. A specific implementation is shown in FIG. 1.

S101, a marine main engine lubrication database is established, including a cylinder lubrication image set, cylinder lubricating oil data and scavenging port residual oil data of an ex-factory bench cylinder, as well as a cylinder lubrication image set, cylinder lubricating oil data and scavenging port residual oil data of a historical cylinder collected in a previous operation.

To establish the marine main engine lubrication database, firstly, a main engine type is determined as MAN MC or ME, RT-FELX or WinGD and its serial number, and rated parameters of the main engine also include bench test data of the marine main engine and main engine operation data of a new ship's trial. All these data are basic and reference data and serve as standards for an analysis of the cylinder lubrication state.

After the marine main engine is determined, a lubrication database of each cylinder is established, including an image set of each cylinder: the inner surface of the cylinder liner, the piston head, the side of the piston head and its piston ring area; and a background database corresponding to each cylinder: a base number of the cylinder oil, a cylinder oil filling rate, a scavenging port residual oil base number and a residual oil iron content. A cylinder lubrication database and the background database are used as reference standards for computer vision learning.

Figure 3:
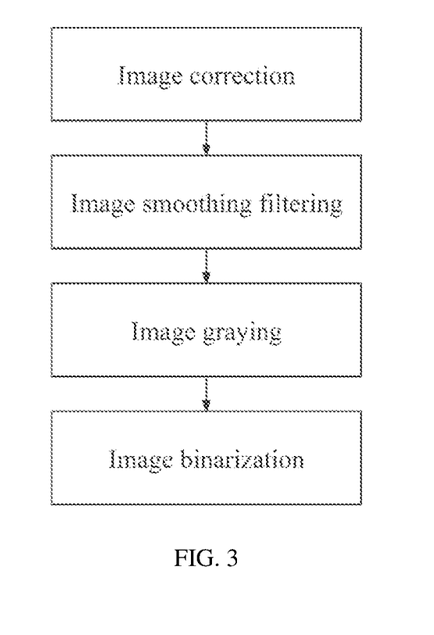
FIG. 3 is a schematic flow chart of preprocessing a cylinder lubrication image set of a current cylinder according to an embodiment of the disclosure.

S102, a cylinder lubrication image set, cylinder lubricating oil data and scavenging residual oil data of the current cylinder are collected in real time, and the cylinder lubrication image set of the current cylinder is preprocessed; and relevant data of the current cylinder is collected, and the cylinder lubrication image set is preprocessed as follows, as shown in FIG. 3.

(a) Cylinder lubrication image correction: because a scavenging box is opened for checking, a position of an image of a checking part taken by the engineer is not fixed, so the image needs to be rotated and corrected to facilitate detection and identification. Effective information of the image obtained from an internal checking of the scavenging box is located in a specific part of the whole image, such as the top of the piston head near a oil head side, a vicinity of a scavenging port on the inner surface of the cylinder liner, the piston ring area, an upper area of a piston side, etc. Therefore, for locating and extracting image feature information in these areas, Hough transform may be used for a line measurement and inclination angle calculation, and then the image is rotated to obtain an image correction result.

(b) Smoothing filtering of cylinder lubrication images: a weight adaptive image denoising method based on morphology may reduce image noises and random noises in an image acquisition process. A median filtering method is adopted to sort gray values in a neighbourhood of pixels and then take a median value as a new gray value of a central pixel, so that pixels with abrupt brightness values in the neighbourhood appear at a beginning or an end of a sequence, and a median filtering algorithm may eliminate these pixels.

(c) Cylinder lubrication image graying: an image defogging technology based on histogram optimization is used for graying photographed color images. Moreover, a gray image is also convenient to store and speed up recognition. An original Red Green Blue (RGB) image is grayed by a weighted average method, and weight coefficients of R, G and B are 0.299, 0.587 and 0.114, respectively, and a most suitable gray image for observation is obtained.

(d) Cylinder lubrication image binarization: a key of image binarization is threshold selection. A gray value $\Gamma$ ($0 \leq \Gamma \leq 225$) of the gray image is binarized, and a gray value $\Gamma$ separating a target from a background is taken as a threshold. When a gray value of a pixel is less than $\Gamma$, a color value of the pixel is 0, otherwise, the color value is 1, only containing a black-and-white binary image, so it is easy to distinguish white carbon deposits from black carbon deposits, and a qualitative description may be obtained to determine whether a fuel filling amount of the cylinder is large or small or whether the base number is high or low.

Figure 4:
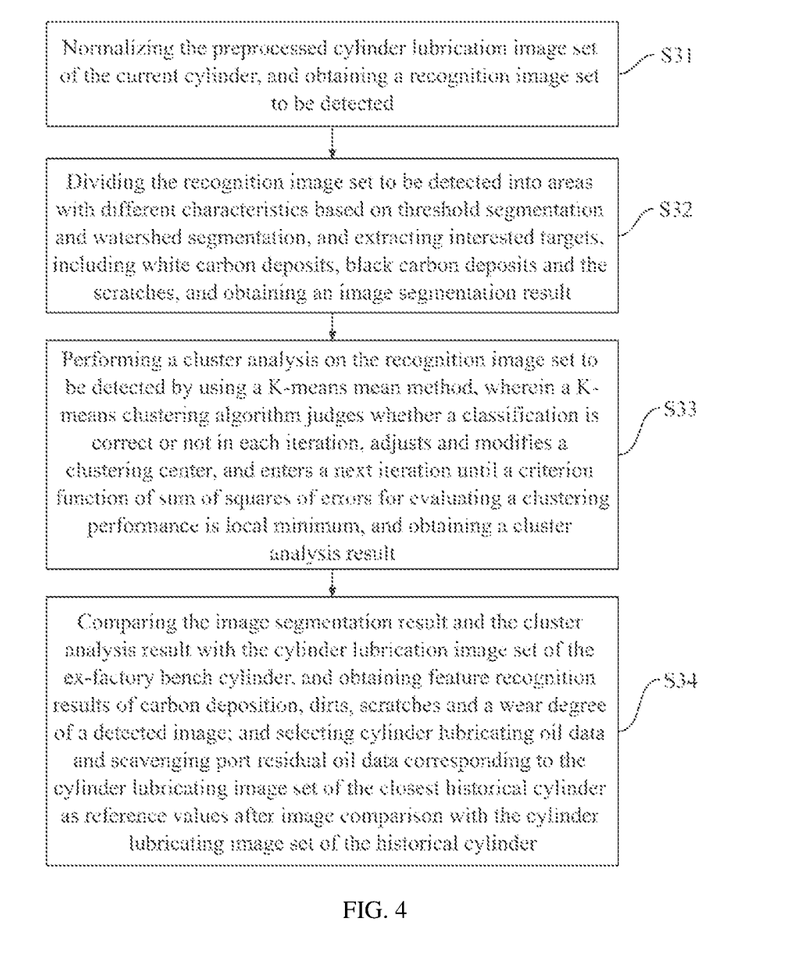
FIG. 4 is a schematic flowchart of a feature recognition method according to an embodiment of the disclosure.

S103, image segmentation and a cluster analysis are performed on the preprocessed cylinder lubrication image set of the current cylinder, and the preprocessed cylinder lubrication image set is compared with the marine main engine lubrication database to obtain feature recognition results of carbon deposition, dirts, scratches and a wear degree, as shown in FIG. 4.

Feature areas of the cylinder lubrication images are the inner surface of the cylinder liner, the top of the piston head, the side of the piston head and the piston ring area. These images are normalized to obtain images to be detected and recognized, which requires specific area segmentation and positioning, Hough transform and target area identification.

Image segmentation is a basis of target detection and recognition of the cylinder lubrication images. In the embodiment of the disclosure, the images of the piston and the cylinder liner are divided into areas with different characteristics based on threshold segmentation and watershed segmentation, and targets (such as the white carbon deposits, the black carbon deposits, scratches, etc.) that the engineer is interested in are extracted.

A most commonly used clustering algorithm is a K-means mean method. Whether a K-means clustering algorithm classifies each cylinder lubrication image sample correctly in each iteration needs to judge, adjust and modify a clustering center, and enter a next iteration until conditions are met. To prevent objects from being redistributed to different clusters, the cluster center is changing, and a criterion function of sum of squares of errors for evaluating a clustering performance is local minimum.

Firstly, image segmentation results and cluster analysis results are compared with the cylinder lubrication image set of the factory bench cylinder, and the feature recognition results of carbon deposition, dirts, scratches and the wear degree of the detected image are obtained; then, the results are compared with cylinder lubrication image sets of all historical cylinders, and then cylinder lubricating oil data and scavenging residual oil data corresponding to a cylinder lubrication image set of a closest historical cylinder are selected as reference values.

S104, a cylinder lubrication quality is evaluated according to the feature recognition results to obtain evaluation grades, and the cylinder lubrication optimization is adjusted according to the evaluation grades.

The evaluation grades are divided into three grades, which are described as follows.

(1) Grade I

There are no scratches on the inner surface of the cylinder liner, and more or less white deposits appear at the top of the piston head, the side of the piston head or around a first ring in the piston ring area, indicating that the cylinder oil filling rate is too high or the base number of the cylinder oil is too high.

(2) Grade II

There are no scratches on the inner surface of the cylinder liner, and more or less black carbon deposits appear at the top of the piston head, the side of the piston head or around the first ring groove in the piston ring area, indicating that the cylinder oil filling rate is too low or the base number of the cylinder oil is too low.

(3) Grade III

There are scratches on the inner surface of the cylinder liner and/or pitting, peeling and pits on the surface of the piston ring, indicating that the cylinder oil filling rate is too low and a dry friction occurs. There are scratches on the inner surface of the cylinder liner, and the inner surface of the cylinder liner is reddish, and the deposits on the top of the piston head are reddish, or/and there are scratches on the surface of the piston ring, indicating that the cylinder is lubricated excessively and the base number of the cylinder oil is too high, resulting in abrasive wear.

According to the feature recognition results of carbon deposition, dirt, scratches and wear degree of the detected image, a corresponding evaluation grade is selected, and then following adjustments are made according to the corresponding grade.

Figure 5:
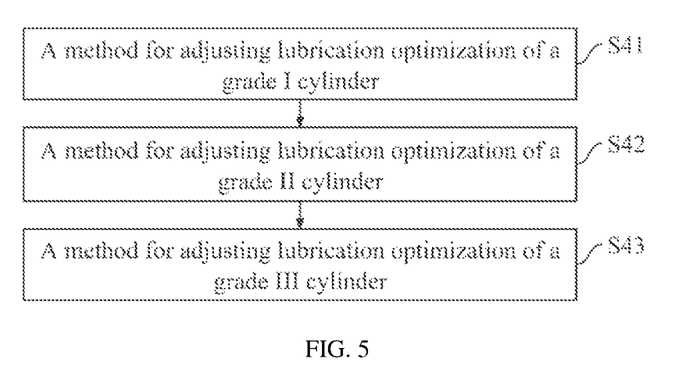
FIG. 5 is a schematic flow chart of methods for adjusting cylinder lubrication optimization according to an embodiment of the disclosure.

Methods for adjusting lubrication optimization are as follows, as shown in FIG. 5.

Figure 6:
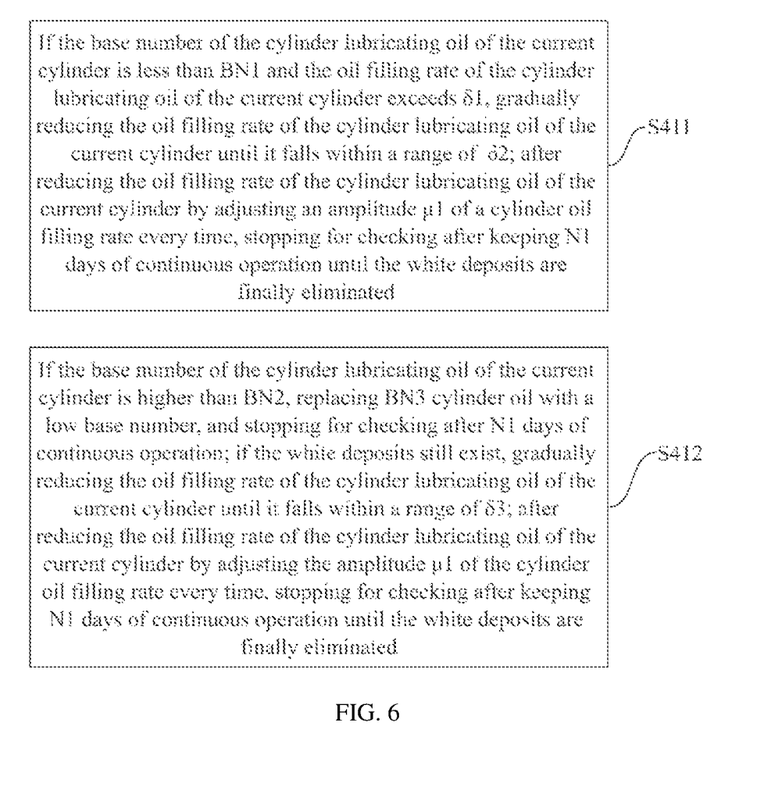
FIG. 6 is a schematic flow chart of a method for adjusting lubrication optimization of a grade I cylinder according to an embodiment of the present invention.

(1) Method for adjusting lubrication optimization of grade I cylinder, as shown in FIG. 6.

(a) If the cylinder oil filling rate is high (more than 1.1 g/kwh), the cylinder oil filling rate should be gradually reduced to a range of 0.9 g/kwh-1.05 g/kwh with an amplitude of 0.05 g/kwh/time. After each reduction, there is a need to stop for checking after keeping about 3 days of operation until the white deposits are finally eliminated.

(b) If the main engine is using cylinder oil with a high base number (BN70-BN100), the cylinder oil should be replaced with cylinder oil with a low base number (BN40-BN70) as soon as possible, and the main engine is stopped for checking after keeping 3 days of continuous operation. If the white deposits still exist after using the cylinder oil with the low base number, the cylinder oil filling rate should be gradually reduced to about 1.0 g/kwh at the amplitude of 0.05 g/kwh/time. After each reduction, there is a need to stop for checking after keeping about 3 days of operation until the white deposits are finally eliminated.

(2) Method for adjusting lubrication optimization of grade II cylinder

If the cylinder oil filling rate is low (less than 0.9 g/kwh), the cylinder oil filling rate should be gradually increased by 0.05 g/kwh/time, and the main engine is stopped for checking after keeping 2 days of continuous operation until the black carbon deposits in an area about 10 CM above the piston ring are eliminated. If the oil filling rate is increased to 1.2 g/kwh and the black carbon deposits are still not eliminated, the cylinder oil should be replaced with cylinder oil with the base number of BN70-BN100, and the main engine is stopped for checking after keeping 3 days of continuous operation. If a checking result confirms that a black carbon deposit trend decreases, the cylinder oil with the high base number will continue to be used; if it is found that the black carbon deposits disappear or slightly white carbon deposits appear, the cylinder oil is changed to cylinder lubricating oil with the low base number BN40-BN70; and if the black carbon deposits continue to exist and have a development trend, a fuel injector of the cylinder should be replaced and followed up.

(3) Method for adjusting lubrication optimization of grade III cylinder grade III indicates that the cylinder liner is excessively worn, so the machine should be stopped immediately to carry out lift cylinder checking and measurement. If a cylinder liner wear of the main engine exceeds a limit value of 0.1 mm/1000 h, it indicates that excessive wear has occurred, and if it is found that the cylinder liner wear exceeds 4/1000 cylinder diameter, the cylinder liner is replaced with a new one. If the cylinder liner wear does not exceed the limit value of 4/1000 cylinder diameter, and there are wear marks on cylinder liner and the piston ring, the base number of the cylinder lubricating oil is reduced, that is, BN40 cylinder oil with a low base number is selected, and at the same time, the oil filling rate of the cylinder oil is gradually increased as soon as possible until hard contact marks are eliminated, with the oil filling rate increasing by 0.2 g/kwh each time, and there is a need to stop for checking after keeping 3 days of operation. If an excessive wear phenomenon is eliminated, the cylinder oil filling rate should be gradually reduced to 0.9-1.1 g/kwh. After each reduction of 0.2 g/kwh, there is a need to stop to open a scavenging box for checking after keeping 3 days of continuous operation. If the hard contact marks are still not eliminated after the oil filling rate of the cylinder oil reaches 1.2 g/kwh, it indicates that a fuel quality is too poor and catalyst particles in the fuel exceed a standard, so there is a need to strengthen fuel filtration or replace the fuel. Whether there is a need to replace the cylinder liner with a new one is confirmed after re-measuring the cylinder liner.

After the lift cylinder checking and the cylinder liner is replaced, all the fuel injectors of the cylinder should be replaced and the cylinder should be run-in according to a running-in procedure required by a main engine manufacturer.

In optimization processes of grade I, grade II and grade III, a scavenging port residual oil value needs to be frequently detected, an iron content in the residual oil is focusing on a trend of decreasing, which indicates that an optimization direction of cylinder lubrication is correct.

If the iron content of the scavenging port residual oil shows a downward trend, it indicates that the cylinder wear is reduced. If the iron content of the scavenging port residual oil is ≥70 ppm and may not be reduced, the adjustment needs to be stopped to check a fuel system, check whether particulate matters in fuel components exceed a standard and whether a main engine oil head is poorly atomized.

If the base number of residual oil is less than 25% of the base number of cylinder oil, cylinder oil with a higher base number is selected.

Goal of cylinder lubrication optimization: the iron content of the scavenging port residual oil is optimally controlled to be the minimum, and the best is that the iron content of the scavenging port residual oil is not more than 40 PPM, and the base number of the residual oil is not less than 25% of the base number of the used cylinder oil, so that the wear is small, there is no corrosion, and there is no carbon deposition.

The cylinder lubrication of the marine main engine is a complex and uncertain problem. At present, it is managed entirely by a working experience of the engineer, and many influencing factors are difficult to be comprehensively analyzed by the experience of the engineer. A cylinder lubrication optimization strategy based on computer vision according to the disclosure may comprehensively learn and analyze historical data, expert experience, checking results and the like to obtain an optimal cylinder lubrication adjustment method, improve the efficiency and reduce mistakes.

Preferred embodiments of the disclosure have been described in detail above. It should be understood that those skilled in the art may make many modifications and changes according to a concept of the disclosure without a creative work. Therefore, any technical scheme that may be obtained by a person skilled in the technical field through a logical analysis, reasoning or limited experiments on a basis of the existing technology according to the concept of the disclosure should be within a protection scope determined by claims.

What is claimed is:

1. A method for adjusting lubrication optimization of a marine main engine cylinder based on computer vision, comprising:

establishing a marine main engine lubrication database, comprising a cylinder lubrication image set, cylinder lubricating oil data and scavenging port residual oil data of an ex-factory bench cylinder, as well as a cylinder lubrication image set, cylinder lubricating oil data and scavenging port residual oil data of a historical cylinder collected in a previous operation;

wherein the cylinder lubrication image set comprises four types of images: an inner surface of a cylinder liner, a piston head area, a side of a piston head and a piston ring area;

the cylinder lubricating oil data comprises a base number and an oil filling rate of cylinder lubricating oil; and the scavenging port residual oil data comprises a residual base number and an iron content of scavenging port residual oil;

collecting a cylinder lubrication image set, cylinder lubricating oil data and scavenging residual oil data of a current cylinder in real time, and preprocessing the cylinder lubrication image set of the current cylinder;

performing image segmentation and a cluster analysis on a preprocessed cylinder lubrication image set of the current cylinder, and comparing the preprocessed cylinder lubrication image set with the marine main engine lubrication database to obtain feature recognition results of carbon deposition, dirts, scratches and a wear degree; and evaluating a cylinder lubrication quality according to the feature recognition results to obtain evaluation grades, and optimizing and adjusting cylinder lubrication according to the evaluation grades;

wherein the evaluation grades are divided into three grades:

grade I: there are no scratches on the inner surface of the cylinder liner, and white deposits appear at a top of the piston head, the side of the piston head or around a first ring in the piston ring area, indicating that the oil filling rate of the cylinder lubricating oil of the current cylinder is too high or the base number of the cylinder lubricating oil of the current cylinder is too high;

grade II: there are no scratches on the inner surface of the cylinder liner, and black carbon deposits appear at the top of the piston head, the side of the piston head or around the first ring groove in the piston ring area, indicating that the oil filling rate of the cylinder lubricating oil of the current cylinder is too low or the base number of the cylinder lubricating oil of the current cylinder is too low; and grade III: there are scratches on the inner surface of the cylinder liner or/and pitting, peeling and pits on a surface of the piston ring, indicating that the oil filling rate of the cylinder lubricating oil of the current cylinder is too low and a dry friction occurs;

there are scratches on the inner surface of the cylinder liner, and the inner surface of the cylinder liner is reddish, and deposits on the top of the piston head are reddish, or there are scratches on the surface of the piston ring, indicating that the cylinder is lubricated excessively and the base number of the cylinder lubricating oil of the current cylinder is too high, resulting in abrasive wear;

wherein methods for adjusting lubrication optimization of the cylinders comprise:

(4.1) a method for adjusting lubrication optimization of a grade I cylinder (4.1.1) in response to the base number of the cylinder lubricating oil of the current cylinder being less than BN1 and the oil filling rate of the cylinder lubricating oil of the current cylinder exceeding $\delta1$, gradually reducing the oil filling rate of the cylinder lubricating oil of the current cylinder until it falls within a range of $\delta2$; after reducing the oil filling rate of the cylinder lubricating oil of the current cylinder by adjusting an amplitude $\mu1$ of a cylinder oil filling rate every time, stopping for checking after keeping N1 days of continuous operation until the white deposits are finally eliminated; and (4.1.2) in response to the base number of the cylinder lubricating oil of the current cylinder being higher than BN2, replacing BN3 cylinder oil with a low base number, and stopping for checking after N1 days of continuous operation; if the white deposits still exist, gradually reducing the oil filling rate of the cylinder lubricating oil of the current cylinder until it falls within a range of $\delta3$; after reducing the oil filling rate of the cylinder lubricating oil of the current cylinder by adjusting the amplitude $\mu1$ of the cylinder oil filling rate every time, stopping for checking after keeping N1 days of continuous operation until the white deposits are finally eliminated;

(4.2) a method for adjusting lubrication optimization of a grade II cylinder in response to the cylinder oil filling rate lubricating oil of the current cylinder being lower than $\delta4$, gradually increasing the oil filling rate of the cylinder lubricating oil of the current cylinder until black carbon deposits in an upper area of the piston ring are eliminated; after increasing by adjusting an amplitude $\mu1$ of the oil filling rate every time, stopping for checking after keeping N2 days of continuous operation; in response to the cylinder oil filling rate lubricating oil of the current cylinder being increased to $\delta5$ and the black carbon deposits are still not eliminated, replacing with cylinder oil with a base number of BN2 and stopping for checking after N1 days of continuous operation; if a checking result confirms that a trend of the black carbon deposits decreases, continuing to use cylinder oil with a high base number; in response to black carbon deposits disappearing or slightly white carbon deposits appearing, changing cylinder lubricating oil with a low base number of BN3; and in response to the checking result showing that the black carbon deposits continue to exist and have a trend of increasing development, replacing a fuel injector of the cylinder and following up; and (4.3) in response to a method for adjusting lubrication optimization of a grade III cylinder grade III indicating that the cylinder liner has an excessive wear accident, the engine is stopped immediately to perform lift cylinder checking and measurement; in response to a wear rate of the main engine cylinder liner exceeding a limit value M and a wear amount of the cylinder liner exceeding a limit value K, replacing with a new cylinder liner; in response to the wear amount of the cylinder liner not exceeding the limit value K, reducing the base number of the cylinder lubricating oil of the current cylinder, and selecting BN4 cylinder oil with a low base number; meanwhile, increasing the oil filling rate of the cylinder lubricating oil of the current cylinder until hard contact marks are eliminated, and stopping for checking after keeping N1 days of continuous operation after increasing by adjusting an amplitude $\mu2$ of the cylinder oil filling rate every time; in response to an excessive wear phenomenon being eliminated, gradually reducing the oil filling rate of the cylinder lubricating oil of the current cylinder to δ6, and stopping to open a scavenging box for checking after keeping N1 days of continuous operation after reducing by adjusting the amplitude μ2 of the cylinder oil filling rate every time; in response to the cylinder oil filling rate lubricating oil of the current cylinder increasing to the limit value of δ5 and the hard contact marks still not being eliminated, strengthening fuel filtration or replacing fuel, and confirming whether there is a need to replace a new cylinder liner after re-measuring the cylinder liner.

2. The method for adjusting the lubrication optimization of the marine main engine cylinder based on computer vision according to claim 1, wherein preprocessing the cylinder lubrication image set of the current cylinder in the step 2 comprises:

image correction: locating areas of images in the cylinder lubrication image set of the current cylinder, extracting image feature information, using Hough transform for a line measurement and an inclination angle calculation, and then rotating the images to obtain an image correction result;

image smoothing filtering: using a weight adaptive image denoising method based on morphology to reduce image noises and random noises in an image acquisition process; adopting a median filtering method to sort gray values in a neighborhood of pixels and then taking a median value as a new gray value of a central pixel, making pixels with abrupt brightness values in the neighborhood appear at a beginning or an end of a sequence, and eliminating these pixels with a median filtering algorithm;

image graying: according to an image defogging technology based on histogram optimization, graying an original red green blue (RGB) image by a weighted average method to obtain a most suitable gray image for observation; and image binarization: setting a threshold value T of the gray values for separating a target from a background; when a gray value of a pixel point is <I, a color value of the pixel point is 0, otherwise, the color value is 1.

3. The method for adjusting the lubrication optimization of the marine main engine cylinder based on computer vision according to claim 1, wherein a feature identification method in the step 3 comprises:

(3.1) normalizing the preprocessed cylinder lubrication image set of the current cylinder, and obtaining a recognition image set to be detected;

(3.2) dividing the recognition image set to be detected into areas with different characteristics based on threshold segmentation and watershed segmentation, and extracting interested targets, comprising white carbon deposits, black carbon deposits and the scratches, and obtaining an image segmentation result;

(3.3) performing a cluster analysis on the recognition image set to be detected by using a K-means mean method, wherein a K-means clustering algorithm judges whether a classification is correct or not in each iteration, adjusts and modifies a clustering center, and enters a next iteration until a criterion function of sum of squares of errors for evaluating a clustering performance is local minimum, and obtaining a cluster analysis result; and (3.4) comparing the image segmentation result and the cluster analysis result with the cylinder lubrication image set of the ex-factory bench cylinder, and obtaining feature recognition results of carbon deposition, dirts, scratches and a wear degree of a detected image; and selecting cylinder lubricating oil data and scavenging port residual oil data corresponding to the cylinder lubricating image set of the closest historical cylinder as reference values after image comparison with the cylinder lubricating image set of the historical cylinder.

4. The method for adjusting the lubrication optimization of the marine main engine cylinder based on computer vision according to claim 1, wherein $\delta1=1.1$ g/kwh, $\delta2=0.9$-$1.05$ g/kwh, $\delta3=1.0$ g/kwh, $\delta4=0.9$ g/kwh, $\delta5=1.2$ g/kwh, and $\delta6=0.9$-$1.1$ g/kwh, $\mu1=0.05$/kwh/time, $\mu2=0.2$/kwh/time, $N1=3$, $N2=2$, $M=0.1$ mm/1000 h, $K=4/1000$ cylinder diameter, $BN1=BN70$, $BN2=BN70$-$BN100$, $BN3=BN40$-$BN70$, and $BN4=BN40$.

5. The method for adjusting the lubrication optimization of the marine main engine cylinder based on computer vision according to claim 1, wherein in a process of adjusting each grade of cylinder lubrication optimization, detecting the residual base number and the iron content of the scavenging port residual oil of the current cylinder for many times to judge an optimal adjustment direction; in response to the iron content of the scavenging port residual oil shows a downward trend, indicating that the cylinder wear is reduced; in response to the iron content of the scavenging port residual oil is >70 ppm and is not most reduced, stopping an adjustment to check a fuel system, check whether particulate matters in fuel components exceed a standard and whether a main engine oil head is poorly atomized; and in response to the residual base number of the scavenging port residual oil is <25% of the base number of the cylinder lubricating oil, selecting cylinder oil with a base number one size higher than the base number of the cylinder lubricating oil.

* * * * *